(12) United States Patent
Palfenier et al.

(10) Patent No.: US 9,041,259 B2
(45) Date of Patent: May 26, 2015

(54) ACTUATOR ASSEMBLY HAVING A MOTOR WITH HEAT DISSIPATION

(75) Inventors: Samuel R. Palfenier, El Paso, TX (US); Oscar Vazquez, Chihuahua (MX); Alejandro Avila, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 211 days.

(21) Appl. No.: 13/551,856

(22) Filed: Jul. 18, 2012

(65) Prior Publication Data
US 2014/0021808 A1 Jan. 23, 2014

(51) Int. Cl.
| | |
|---|---|
| *H02K 9/22* | (2006.01) |
| *H02K 5/08* | (2006.01) |
| *H02K 5/20* | (2006.01) |
| *H02K 9/19* | (2006.01) |
| H02K 5/12 | (2006.01) |
| H02K 5/16 | (2006.01) |
| H02K 9/193 | (2006.01) |
| H02K 7/116 | (2006.01) |
| H02K 11/00 | (2006.01) |

(52) U.S. Cl.
CPC .. *H02K 9/22* (2013.01); *H02K 5/12* (2013.01); *H02K 5/16* (2013.01); *H02K 5/08* (2013.01); *H02K 9/193* (2013.01); *H02K 5/20* (2013.01); *H02K 7/116* (2013.01); *H02K 9/19* (2013.01); *H02K 11/0073* (2013.01)

(58) Field of Classification Search
IPC .................. H02K 1/182,5/16, 5/18, 9/197, 9/22
See application file for complete search history.

(56) References Cited

U.S. PATENT DOCUMENTS

| | | | |
|---|---|---|---|
| 4,959,672 A | 9/1990 | Yoshino et al. | |
| 5,744,880 A * | 4/1998 | Kudoh et al. | 310/58 |
| 6,329,731 B1 * | 12/2001 | Arbanas et al. | 310/52 |
| 6,902,380 B2 * | 6/2005 | Ojima et al. | 417/410.4 |
| 6,964,213 B2 | 11/2005 | Newman et al. | |
| 7,036,206 B2 | 5/2006 | Worden et al. | |
| 7,323,835 B2 | 1/2008 | Hazelton et al. | |
| 7,429,810 B2 * | 9/2008 | Ueda et al. | 310/54 |
| 2004/0108779 A1 * | 6/2004 | Boettger et al. | 310/89 |

FOREIGN PATENT DOCUMENTS

GB 680078 10/1952

* cited by examiner

*Primary Examiner* — John K Kim
*Assistant Examiner* — Rashad Johnson
(74) *Attorney, Agent, or Firm* — Thomas M Twomey

(57) ABSTRACT

An actuator assembly includes a housing with a motor compartment, a gear compartment, a bulkhead separating the motor compartment from the gear compartment, and an aperture through the bulkhead. The actuator assembly also includes a motor assembly in the motor compartment defining a space radially between the motor assembly and the gear motor compartment. A high thermal conductivity material is disposed within the space to transfer heat from the motor assembly to the housing. The bulkhead includes one of a groove and a rib surrounding the aperture on the side of the bulkhead facing the motor compartment and the motor assembly includes the other of the groove and the rib such that the rib fits within the groove to prevent the high thermal conductivity material from migrating radially inward of the groove and the rib when the high thermal conductivity material is injected into the space.

14 Claims, 5 Drawing Sheets

ACTUATOR ASSEMBLY HAVING A MOTOR WITH HEAT DISSIPATION

TECHNICAL FIELD OF INVENTION

The present invention relates to a motor; more particularly to a motor in a housing; and even more particularly to a motor in a housing with a high thermal conductivity material to dissipate heat from the motor to the housing; and still even more particularly to an actuator assembly with a high thermal conductivity material to dissipate heat from a motor of the actuator assembly to a housing of the actuator assembly.

BACKGROUND OF INVENTION

It is known for an actuator assembly to have an electric motor disposed within a housing. In such an arrangement, a space may be formed radially between the housing and the electric motor. This space may be filled with air, which is known to act as a good thermal insulator when confined. Heat may be generated by the electric motor during operation of the actuator assembly. If the heat generated by the electric motor is not able to be dissipated, excessive temperatures within the actuator assembly may result which may lead to unsatisfactory performance. In order to dissipate heat generated by the electric motor, it may be desirable to transfer heat to the housing which may be a good thermal conductor, for example, metal. Heat from the housing may then be transferred to the atmosphere and/or to a liquid coolant. However, the radial space between the electric motor and the housing may prevent an efficient transfer of heat from the electric motor to the housing. If a material with an ability to transfer heat more readily from the electric motor to the housing than air is used to fill the radial space between the electric motor and the housing, care must be taken to prevent the material from reaching the rotating components of the electric motor.

What is needed is an actuator assembly which minimizes or eliminates one or more of the shortcomings as set forth above.

SUMMARY OF THE INVENTION

Briefly described, an actuator assembly includes a housing having a central axis, a motor compartment on one end defined about the central axis, a gear compartment on the other end, a bulkhead separating the motor compartment from the gear compartment, and an aperture through the bulkhead. The actuator assembly also includes a motor assembly in the motor compartment defining a space radially between the motor assembly and the gear compartment and having an input shaft extending into the gear compartment through the aperture. A high thermal conductivity material is disposed within the space to transfer heat from the motor assembly to the housing. An output shaft extends out of the gear compartment and a gear assembly supported within the gear compartment translates rotation of the input shaft to the output shaft. The bulkhead includes one of a groove and a rib on a side the bulkhead that faces the motor compartment, wherein the one of the groove and the rib surrounds the aperture, and wherein the motor assembly includes the other of the groove and the rib such that the rib fits within the groove to prevent the high thermal conductivity material from migrating radially inward of the groove and the rib when the high thermal conductivity material is injected into the space.

BRIEF DESCRIPTION OF DRAWINGS

This invention will be further described with reference to the accompanying drawings in which.

DETAILED DESCRIPTION OF INVENTION

Figure 1:
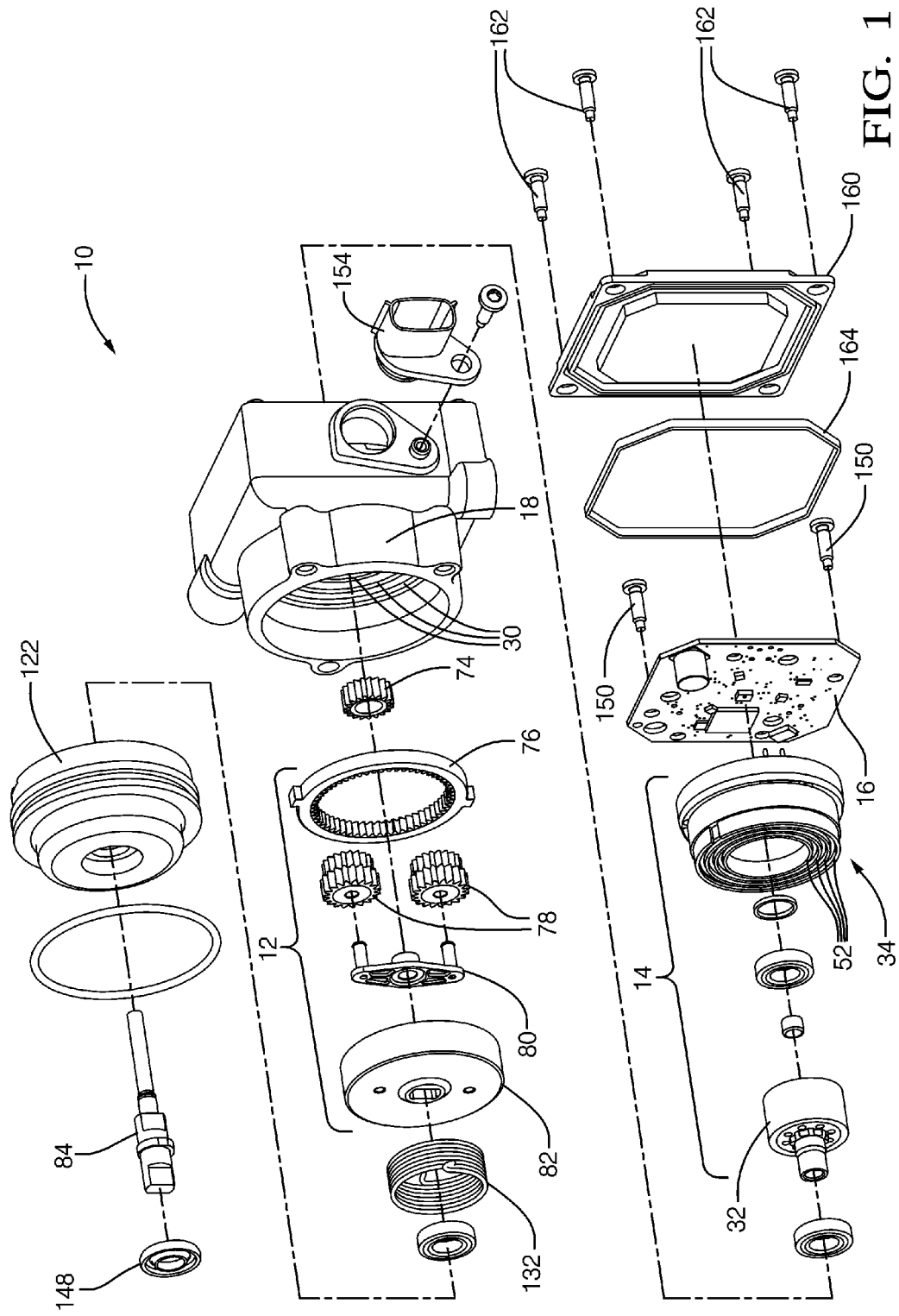
FIG. 1 is an exploded isometric view of an actuator in accordance with the present invention.
Figure 2:
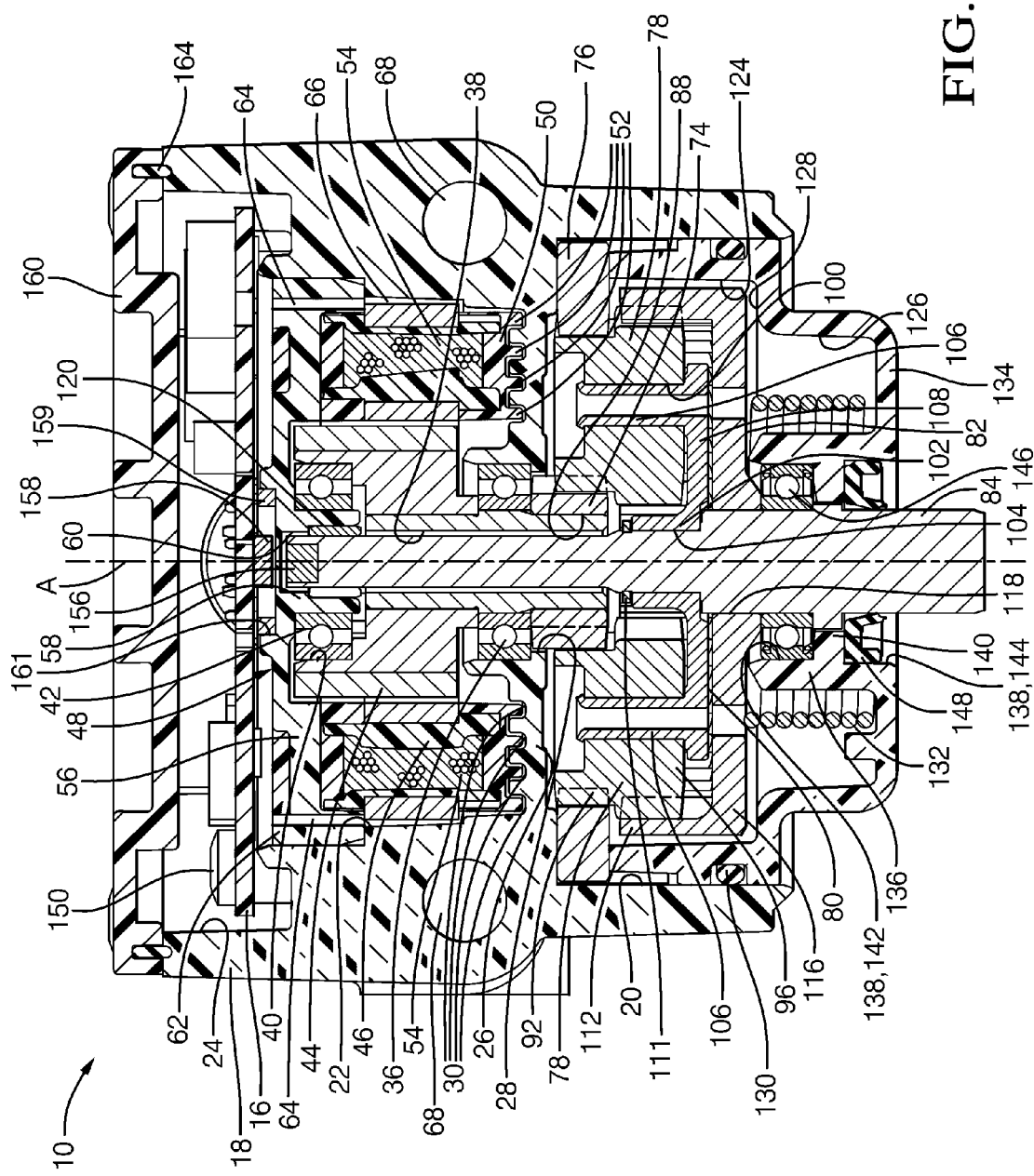
FIG. 2 is an axial cross section of the actuator assembly of FIG. 1.

Reference will be made to FIGS. 1 and 2 in which FIG. 1 is an exploded isometric view of an actuator assembly 10 and FIG. 2 is an axial cross-section of actuator assembly 10. Actuator assembly 10 generally includes a gear assembly 12, a motor assembly 14, and a circuit board assembly 16 all located within a housing 18. Motor assembly 14 may generically be referred to as a rotating electric machine. Housing 18 extends along axis A and includes a gear compartment 20 for receiving gear assembly 12, a motor compartment 22 for receiving motor assembly 14, and a circuit board compartment 24 for receiving circuit board assembly 16. Gear compartment 20 may be separated from motor compartment 22 by a bulkhead 26 having a bulkhead aperture 28 extending therethrough and centered about axis A. Bulkhead 26 generally defines a bottom wall of motor compartment 22. Bulkhead 26 may contain features, for example, a plurality of grooves 30 that concentrically surround bulkhead aperture 28 on the side of bulkhead 26 that faces toward motor compartment 22. Grooves 30 will be discussed in more detail later. Housing 18 may be made of a light weight metallic material, for example, aluminum. However, it should be understood that housing 18 may be made of any metallic or non-metallic material that has sufficient strength to withstand forces encountered by actuator assembly 10 and that is compatible with the operating environment of actuator assembly 10.

Motor assembly 14 will now be described with continued reference to FIGS. 1 and 2. Motor assembly 14 may be a brushless DC motor with a rotor assembly 32 and a stator assembly 34, however it should be understood that motor assembly 14 may be a brushed motor rather than a brushless motor. Rotor assembly 32 passes through bulkhead aperture 28 and is supported within bulkhead aperture 28 by a first bearing 36 such that rotor assembly 32 is free to rotate about axis A within stator assembly 34. First bearing 36 may be a conventional ball roller bearing which is press fit within bulkhead aperture 28 and which receives rotor assembly 32 in a press fit relationship. Rotor assembly 32 includes a rotor central bore 38 extending centrally through rotor assembly 32 and centered along axis A. Rotor central bore 38 will be discussed in more detail later. Rotor assembly 32 also includes a rotor bearing bore 40 in the end of rotor assembly 32 that is located within motor compartment 22 and distal from bulkhead 26. Rotor bearing bore 40 is coaxial with rotor central bore 38 and receives a second bearing 42 therewithin for supporting rotor assembly 32 as will be described later. Second bearing 42 may be a conventional ball roller bearing that is press fit within rotor bearing bore 40. Rotor assembly 32 also includes a multi-pole ring magnet 44 radially surrounding the perimeter thereof such that the poles are arranged in a polar array of alternating north and south poles. Multi-pole ring magnet 44 may, for example only, include five pole pairs where each pole is equal in angular length.

Stator assembly 34 includes a stator 46 and a stator support frame 48 that is axially offset from said stator 46. Stator 46 is fixed to stator support frame 48 with an over-molding material 50 to prevent relative rotation therebetween. In order to apply over-molding material 50 to stator 46 and stator support frame 48, stator 46 and stator support frame 48 are placed in a mold (not shown) having a cavity corresponding to the outside surface of over-molding material 50. Over-molding material 50 is then injected, in liquid form, into the cavity. After over-molding material 50 solidifies, the mold is removed and over-molding material 50 fixes stator 46 to stator support frame 48. Over-molding material 50 may include a plurality of annular rings 52 that are concentric to axis A. Annular rings 52 will be discussed in greater detail later. Stator 46 includes a plurality of electric windings 54 spaced at equal angular intervals around stator 46. While only two electric windings 54 are visible in FIG. 2, it should be understood that additional windings electric 54 may be included that are not visible in FIG. 2. For example, stator 46 may include a total of six electric windings 54 that are equi-angularly spaced around stator 46.

Stator support frame 48 is coaxial with stator 46 and disposed at the end of stator assembly 34 that is distal from bulkhead 26. Stator support frame 48 includes a central section 56 that is circular and centered about axis A. A hub 58 extends axially away from central section 56 toward bulkhead 26 such that hub 58 is centered about axis A. Hub 58 extends through second bearing 42 in a close fit nature, for example by press fit, in order to support second bearing 42 which in turn supports the end of rotor assembly 32 that is proximal to stator support frame 48. Hub 58 includes a hub central bore 60 extending coaxially thereinto from the end of hub 58 that is proximal to bulkhead 26. Hub central bore 60 will be discussed in more detail later. Stator support frame 48 also includes stator support frame rim 62 which radially surrounds central section 56 such that the length of stator support frame rim 62 in the direction of axis A is greater than the length of central section 56 in the direction of axis A. Stator support frame rim 62 may include one or more stator support frame apertures 64 that extend therethrough in the general direction of axis A. Stator assembly 34 is fixed within motor compartment 22, for example, by press fit of stator support frame rim 62 with motor compartment 22 in order to prevent relative rotation between stator assembly 34 and housing 18. The increased length of stator support frame rim 62 compared to central section 56 helps to prevent motor assembly 14 from tipping within housing 18, thereby maintaining motor assembly 14 in a coaxial relationship with housing 18.

In order to dissipate heat generated by motor assembly 14, a high thermal conductivity material 66 may be injected into the annular space formed radially between motor assembly 14 and motor compartment 22, and more specifically radially between stator 46 and motor compartment 22. High thermal conductivity material 66 is defined by a material that is more thermally conductive than air which has a thermal conductivity between 0.02 W/m·K (watts per meter kelvin) and 0.5 W/m·K over the range of operating temperatures of actuator assembly 10. Preferably, high thermal conductivity material 66 has a thermal conductivity of at least 1.6 W/m·K (watts per meter kelvin). High thermal conductivity material 66 may be injected into this annular space in liquid form through stator support frame apertures 64. After high thermal conductivity material 66 is injected, high thermal conductivity material 66 may be cured to form a solid material. High thermal conductivity material 66 may also possess adhesive properties which aid in fixing motor assembly 14, and more specifically stator 46, to housing 18. In order to prevent high thermal conductivity material 66 from migrating to rotor assembly 32 and first bearing 36 during injection thereof, each annular ring 52 of over-molding material 50 may fit within one groove 30 in bulkhead 26. The plurality of annular rings 52 together with grooves 30 form a tortuous path that prevent high thermal conductivity material 66 from migrating to rotor assembly 32 and first bearing 36. In this way, high thermal conductivity material 66 is prevented from migrating radially inward of annular rings 52 and grooves 30. While four annular rings 52 and four grooves 30 are shown, it should now be understood that a greater or lesser number of annular rings 52 and grooves 30 may be provided. While annular rings 52 and grooves 30 are shown as circular, it should now be understood that annular rings 52 and grooves 30 may take the form of other shapes.

Figure 3:
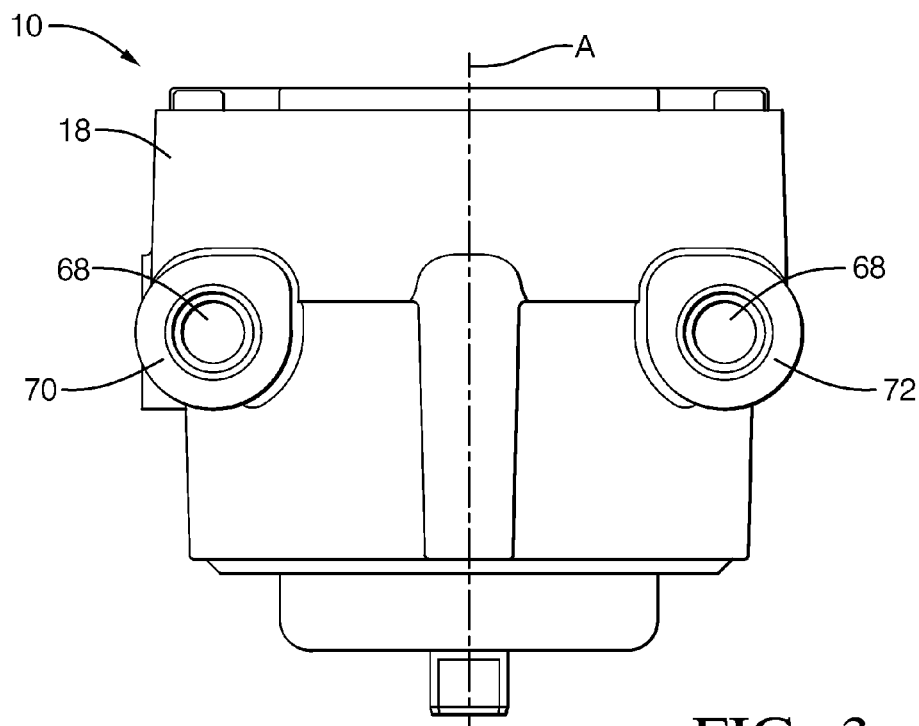
FIG. 3 is an elevation view of the actuator assembly of FIG. 1.

Reference will continue to be made to FIGS. 1 and 2 and additional reference will be made to FIG. 3 which is an elevation view of actuator assembly 10. In order to further dissipate heat generated by motor assembly 14, a cooling passage 68 may be provided through housing 18 at a location that preferably radially surrounds at least a portion of motor assembly 14. Cooling passage 68 includes a cooling passage inlet 70 for receiving a liquid coolant at a relatively cool temperature from a coolant source (not shown). Cooling passage 68 also includes a cooling passage outlet 72 for discharging the liquid coolant from housing 18 at a temperature that is elevated compared to the temperature of the liquid coolant at cooling passage inlet 70. Heat that is generated by motor assembly 14 is transferred through high thermal conductivity material 66 and housing 18 to the liquid coolant as the liquid coolant moves from the cooling passage inlet 70 to the cooling passage outlet 72, thereby cooling actuator assembly 10.

Figure 4:
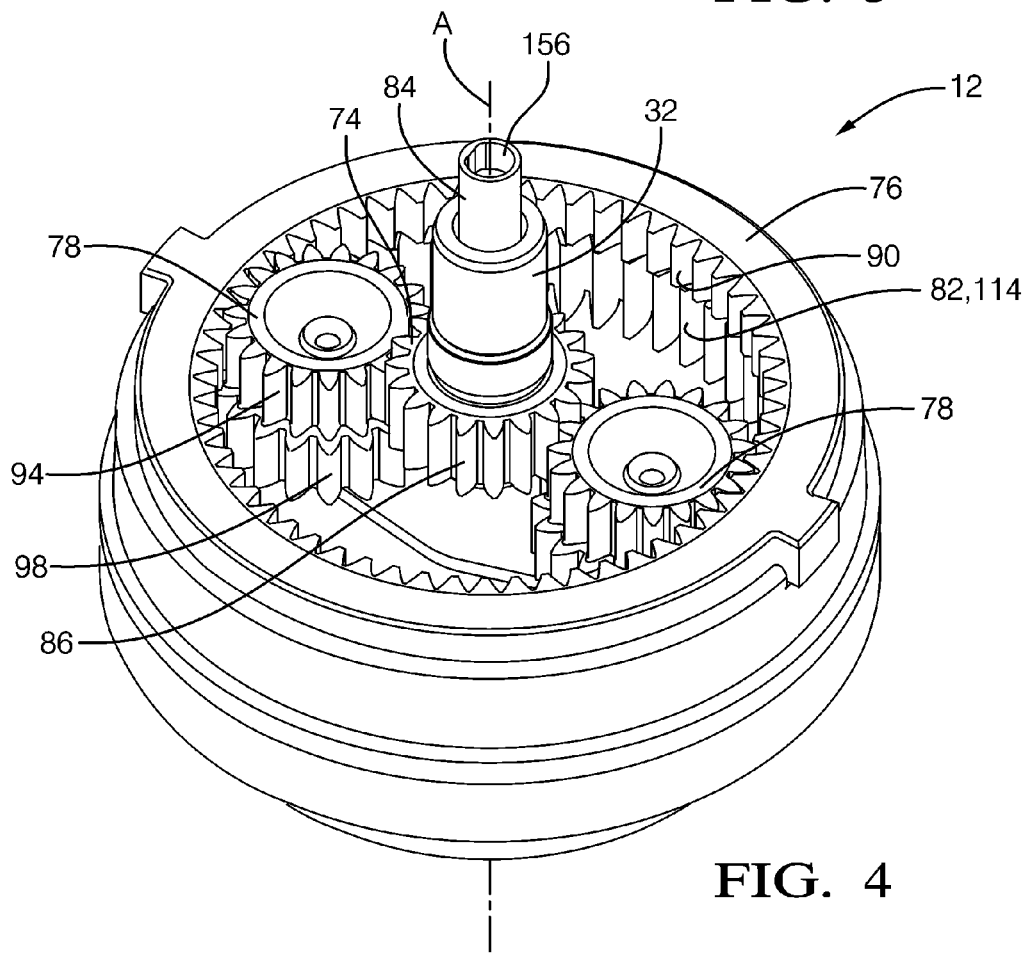
FIG. 4 is an isometric view of a gear assembly of the actuator assembly of FIG. 1.
Figure 5:
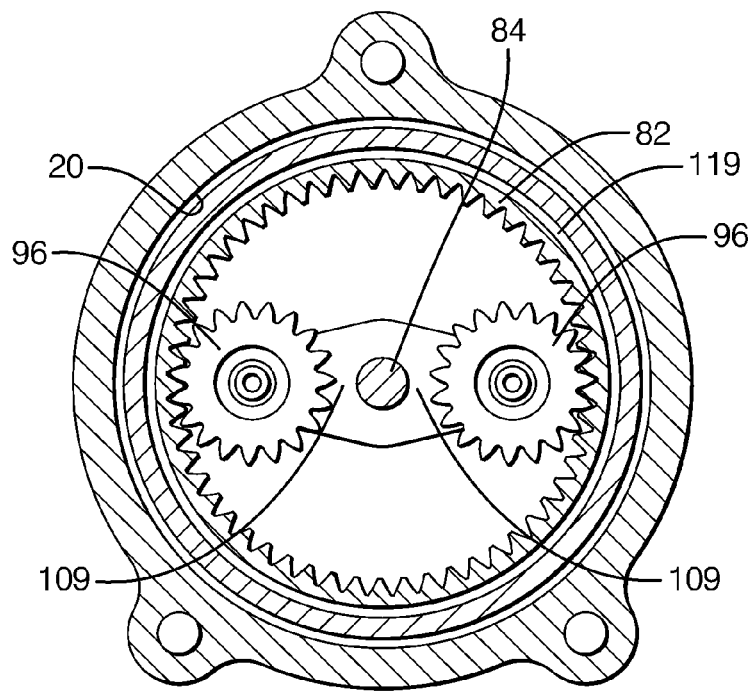
FIG. 5 FIG. 5 is an axial view of a portion of the gear assembly of FIG. 4.

Gear assembly 12 will now be described with continued reference to FIGS. 1 and 2 and with additional reference to FIG. 4 which is an isometric view of gear assembly 12 and FIG. 5 which is an axial view of a portion of gear assembly 12. Gear assembly 12 generally includes pinion gear 74, input gear 76, idler gears 78, idler gear carrier 80, output gear 82, and output shaft 84.

Pinion gear 74 is fixed, for example by press fit, to the portion of rotor assembly 32 that extends into gear compartment 20 such that pinion gear 74 rotates with rotor assembly 32 in a one-to-one relationship. In this way, the portion of rotor assembly 32 that extends into gear compartment 20 acts as an input shaft to gear assembly 12. Pinion gear 74 includes a plurality of pinion gear teeth 86 that extend radially outward therefrom and a pinion gear central bore 88 that extends axially through pinion gear 74 centered about axis A. Pinion gear 74 may be made, for example only, of a molded plastic material.

Input gear 76 concentrically surrounds pinion gear 74 and includes a plurality of input gear teeth 90 that extend radially inward therefrom. Input gear 76 is larger in diameter than pinion gear 74 to define an annular space between input gear 76 and pinion gear 74. Input gear 76 is fixed relative to housing 18, as will be described later, in order to prevent relative rotation between input gear 76 and housing 18. Input gear 76 may be made, for example only, of a molded plastic material.

Each idler gear 78 is a stepped diameter gear with an idler gear input section 92 having a plurality of idler gear input section teeth 94 that extend radially outward therefrom. Idler gear input section 92 fits within the annular space between input gear 76 and pinion gear 74 such that idler gear input section teeth 94 mesh with pinion gear teeth 86 and input gear teeth 90. Each idler gear 78 also includes an idler gear output section 96 having a plurality of idler gear output section teeth 98 that extend radially outward therefrom. Idler gear output section 96 is fixed to idler gear input section 92, for example by molding idler gear output section 96 to idler gear input section 92 as a single piece of plastic, such that idler gear output section 96 rotates together with idler gear input section 92 in a one-to-one relationship. As shown, idler gear input section 92 is smaller in diameter than idler gear output section 96 and idler gear input section 92 has fewer idler gear input section teeth 94 than idler gear output section 96 has idler gear output section teeth 98, however, it should be understood that this relationship may be reversed to achieve different gear ratios of gear assembly 12. Each idler gear 78 also includes an idler gear bore 100 extending centrally therethrough in the same direction as axis A.

Idler gear carrier 80 includes an idler gear carrier hub 102 with idler gear carrier hub bore 104 extending therethrough and centered about axis A. Idler gear carrier 80 also includes a plurality of regularly spaced idler gear carrier axles 106 radially offset from idler gear carrier hub 102. The number of idler gear carrier axles 106 corresponds to the number of idler gears 78 such that each idler gear 78 is associated with one idler gear carrier axle 106. Each idler gear carrier axle 106 extends into idler gear bore 100 of a respective idler gear 78. Each idle gear carrier axle 106 is sized to be in a close fit relationship with idler gear bore 100 such that idler gear 78 is able to freely rotate about idler gear carrier axle 106 while supporting idler gear 78 to substantially prevent relative radial movement between idler gear 78 and idler gear carrier axle 106. Idler gear carrier axles 106 are joined to idler gear carrier hub 102 with idler gear carrier bridge section 108. Each idler gear 78 may be retained on its respective idler gear carrier axle 106 by enlarging a portion of each idler gear carrier axle 106 that protrudes beyond its respective idler gear 78 as shown in FIG. 2. It should now be understood that other methods of retaining idler gears 78 may be used, for example, by retention clips that fit within a groove on idler gear carrier axles 106 by retention clips that fit with idler gear carrier axles 106 in an interference relationship. Output shaft 84 passes through idler gear carrier hub bore 104 in a close fit relationship such that idler gear carrier 80 is able to freely rotate about output shaft 84 while output shaft 84 supports idler gear carrier 80 to substantially prevent relative radial movement between idler gear carrier 80 and output shaft 84. In this way, a predetermined radial design clearance 109 is formed between idler gear output section 96 and output shaft 84 which may be most easily seen in FIG. 5. Idler gear carrier 80 may be retained on output shaft 84 with a retention clip 111 that may fit within a groove formed in output shaft 84 as shown in FIG. 2.

Output gear 82 includes an outer output gear ring portion 112 with a plurality of output gear teeth 114 extending radially inward therefrom to mesh with idler gear output section teeth 98. Output gear 82 also includes an output gear disk section 116 that extends radially inward from output gear ring portion 112 and terminates at an output gear bore 118 that extends through output gear disk section 116 in the same direction as axis A. Output shaft 84 passes through output gear bore 118 and is fixed thereto, for example by a press fit relationship between output shaft 84 and output gear bore 118, in order to prevent relative rotation between output gear 82 and output shaft 84. Output gear 82 defines a predetermined radial design clearance 119 with gear compartment 20. Output gear 82 may be made, for example only, of a molded plastic material.

Predetermined radial design clearances 109 and 119 allow a predetermined range of gear ratios for gear assembly 12 by providing sufficient room for different sized output gears 82 and idler gears 78 within gear compartment 20 of housing 18 having a fixed diameter. In this way, a common housing 18 may be used for the predetermined range of gear ratios, thereby a change in gear ratio of gear assembly 12 requires only a change of gear assembly components which are easily manufactured, for example by molded plastic.

In addition to passing through output gear 82 and idler gear carrier 80, output shaft 84 also passes through rotor assembly 32 by way of rotor central bore 38. In this way, output shaft 84 extends into motor compartment 22. Output shaft 84 extends into hub central bore 60 of stator support frame 48 where output shaft 84 is supported by a bushing 120 which is press fit within hub central bore 60. Output shaft 84 interfaces with bushing 120 in a close fit relationship such that output shaft 84 is allowed to freely rotate with respect to bushing 120 and such that bushing 120 supports output shaft 84 to substantially prevent relative radial movement between output shaft 84 and bushing 120. Bushing 120 may be made of a metallic material, for example only, brass or bronze.

A gear compartment cover 122 is provided to support and enclose gear assembly 12 within gear compartment 20. Gear compartment cover 122 is generally cup-shaped to provide a first gear compartment cover volume 124 and a second gear compartment cover volume 126 therewithin. A gear compartment cover shoulder 128 separates first gear compartment cover volume 124 and second gear compartment cover volume 126. Pinion gear 74, input gear 76, idler gears 78, idler gear carrier 80, output gear 82, and output shaft 84 are received within first gear compartment cover volume 124 such that input gear 76 is fixed to gear compartment cover 122, for example by press fit within gear compartment cover 122, to prevent relative rotation of input gear 76 with gear compartment cover 122. Gear compartment cover 122 is fixed to housing 18, for example by press fit within motor compartment 22, in order to prevent relative rotation of gear compartment cover 122 with housing 18, and consequently, relative rotation between input gear 76 and housing 18 is prevented. A gear compartment cover seal 130 may be provided to seal the interface between gear compartment seal cover 130 and gear compartment 20.

A return spring 132 may be provided within second gear compartment cover volume 126. Return spring 132 may be a coiled torsional spring in which one end of return spring 132 may be grounded to gear compartment cover 122 while the other end of return spring 132 is attached to output gear 82. If a failure of motor assembly 14 occurs during operation, return spring 132 may urge output gear 82, and consequently output shaft 84, to a predetermined default angular position.

Second gear compartment cover volume 126 is terminated at an end distal from gear compartment cover shoulder 128 by gear compartment cover cap 134 which includes a gear compartment cover hub 136 having a gear compartment cover bore 138 extending therethrough in the same direction as axis A and centered about axis A. Gear compartment cover hub 136 may extend axially into second gear compartment cover volume 126. Gear compartment cover bore 138 may include a gear compartment cover bore flange 140 that extends part way radially inward therefrom. In this way gear compartment cover bore flange 140 divides gear compartment cover bore 138 into a first gear compartment cover bore section 142 that faces toward first gear compartment cover volume 124 and a second gear compartment cover bore section 144 that faces away from first gear compartment cover volume 124. First gear compartment cover bore section 142 may receive a third bearing 146. Third bearing 146 may be a conventional ball roller bearing that is press fit within first gear compartment cover bore section 142 and which receives output shaft 84 in a press fit relationship such that output shaft 84 passes through third bearing 146 to the exterior of gear compartment cover 122. Second gear compartment cover bore section 144 may receive an output shaft seal 148 in order to provide a seal between gear compartment cover bore 138 and output shaft 84, thereby preventing contaminants such as dust or moisture from entering gear compartment 20.

Figure 6:
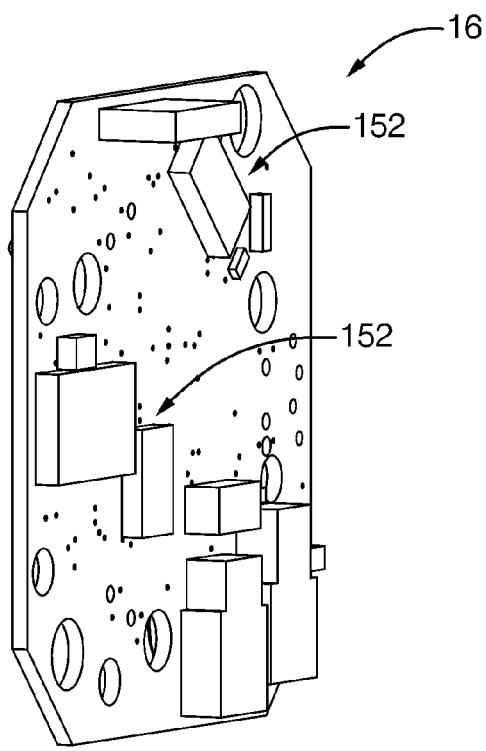
FIG. 6 is an isometric view of a first side of a circuit board assembly of the actuator assembly of FIG. 1.
Figure 7:
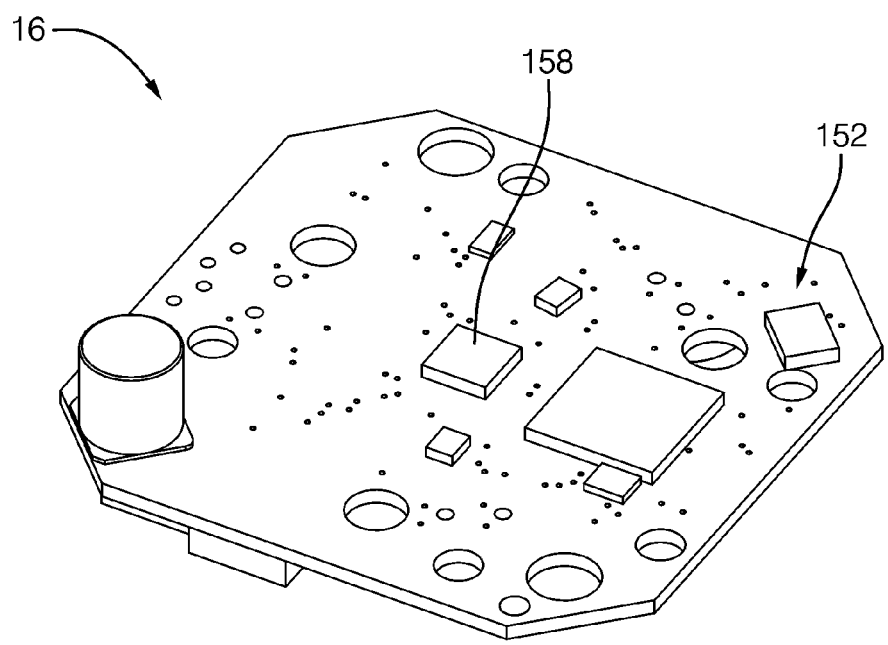
FIG. 7 is an isometric view of a second side of a circuit board assembly of the actuator assembly of FIG. 1.

Circuit board assembly 16 will now be described with reference to FIGS. 1, 2, 6, and 7 where FIG. 6 is an isometric view of the side of circuit board assembly 16 which faces away from bulkhead 26 while FIG. 7 is an isometric view of the side of circuit board assembly 16 which faces toward bulkhead 26. Circuit board assembly 16 may be secured across motor compartment 22 within circuit board compartment 24 using circuit board fasteners 150. In this way, circuit board assembly 16 separates motor compartment 22 from circuit board compartment 24.

Circuit board assembly 16 includes electrical circuits and electrical componentry generally indicated by reference numeral 152 which are connected to an external power source (not shown) through an electrical connector 154. Electrical circuits and electrical componentry 152 are also connected with electrical windings 54 and are used to control the rotation of rotor assembly 32.

Figure 8:
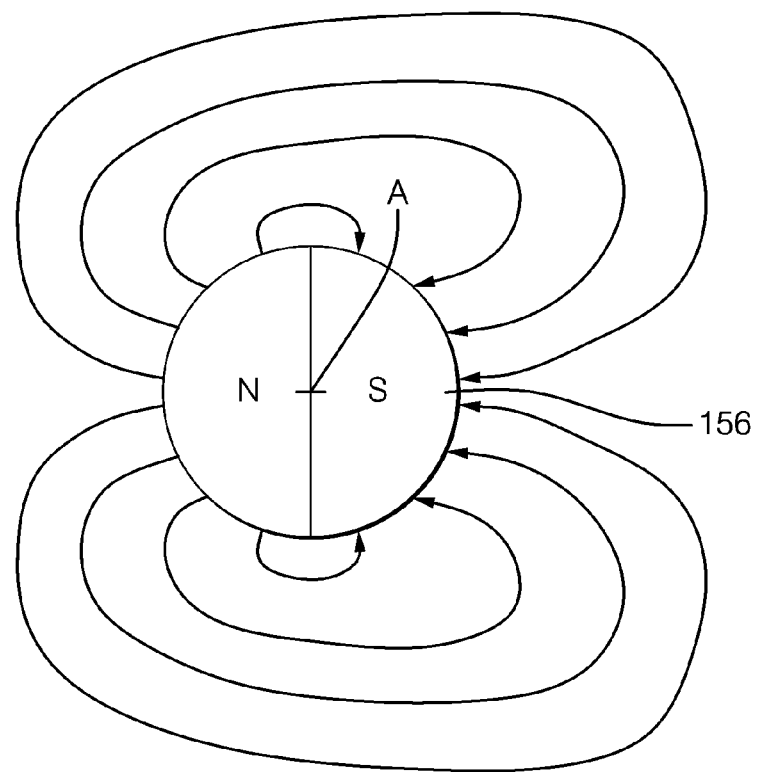
FIG. 8 is a top view of a magnet used to sense the rotational position of an output shaft of the actuator assembly of FIG. 1.

Reference will now be made to FIGS. 1, 2, 7, and 8. In order to sense the rotational position of output shaft 84, the end of output shaft 84 proximal to circuit board assembly 16 may include a sensed element which is illustrated as magnet 156 fixed to output shaft 84 to rotate with output shaft 84 in a one-to-one relationship. Magnet 156 is cylindrical and centered about axis A with a direction of magnetism that is through its diameter, i.e. a plane that is parallel and through axis A divides magnet 156 into its north and south poles represented by N and S respectively in FIG. 8. Magnet 156 produces a magnetic field as illustrated in FIG. 8. An electronic position sensor 158 is fixed to circuit board assembly 16 in close proximity to magnet 156 such that magnet 156 points toward position sensor 158. When output shaft 84 is rotated in operation, the direction of the magnetic field produced by magnet 156 changes relative to position sensor 158 which is stationary. The change in direction of the magnetic field is sensed by position sensor 158 and consequently the rotational position of output shaft 84 is able to be determined. Alternatively, but not shown, magnet 156 may be offset relative to axis A and position sensor 158 may be a Hall Effect sensor.

By allowing output shaft 84 with magnet 156 to pass through stator assembly 34, the position of output shaft 84 can be sensed without the need for electronic componentry remote from circuit board assembly 16. This allows all of the electronics for operation of actuator assembly 10, i.e. operation of motor assembly 14 and sensing of output shaft 84, to be included with circuit board assembly 16 which allows for ease of assembly of actuator assembly 10.

One or both of second bearing 42 and bushing 120 may act to shield position sensor 158 from magnetic flux generated by motor assembly 14. The magnetic flux shielding properties of one or both of second bearing 42 and bushing 120 is the result of the metallic nature of the components of second bearing 42 (inner race, outer race, and ball bearings) and the metallic nature of bushing 120. Shield 159 may also be provided to further protect position sensor 158 from magnetic flux generated by motor assembly 14. Shield 159 may be ring shaped and made of a material, for example metal, that is able to shield magnetic flux. A shield 159 may be disposed at least partly within a shield bore 161 of stator support frame 48. Shield bore 161 is formed in the face of stator support frame 48 that faces toward circuit board assembly 16 and is centered about axis A. Shield 159 may radially surround at least a portion of position sensor 158 as shown. In this way, second bearing 42, bushing 120, and shield 159 may reduce or eliminate magnetic flux generated by motor assembly 14 to allow position sensor 158 to operate in an environment that would otherwise be contaminated with magnetic flux from motor assembly 14 which could interfere with the operation of position sensor 158.

Circuit board assembly 16 is enclosed within circuit board compartment 24 with a circuit board compartment cover 160 which may be fastened to housing 18 with circuit board compartment cover fasteners 162. Circuit board compartment cover seal 164 may be provided between circuit board compartment cover 160 and housing 18 to prevent intrusion of moisture and other foreign material that may have an undesirable effect on circuit board assembly 16. Circuit board compartment cover seal 164 may be received within one or more grooves formed within circuit board compartment cover 160 and/or housing 18.

While this invention has been described herein with reference to an actuator assembly, it should now be understood that this invention is equally applicable to electric rotating machines in general, for example, electric motors, electrical generators, and motor generators.

While this invention has been described in terms of preferred embodiments thereof, it is not intended to be so limited.

We claim:
1. An actuator assembly comprising:
  a housing having a central axis, a motor compartment on one end defined about said central axis, a gear compartment on the other end, a bulkhead separating said motor compartment from said gear compartment, and an aperture through said bulkhead;
  a motor assembly in said motor compartment defining a space radially between said motor assembly and said motor compartment and having an input shaft extending into said gear compartment through said aperture;
  a high thermal conductivity material disposed within said space to transfer heat from said motor assembly to said housing;
  an output shaft extending out of said gear compartment; and
  a gear assembly supported within said gear compartment translating rotation of said input shaft to said output shaft;
  wherein said bulkhead includes one of a groove and a rib on a side of said bulkhead that faces said motor compartment;
  wherein said one of said groove and said rib surrounds said aperture;
  wherein said motor assembly includes the other of said groove and said rib such that said rib fits within said groove to prevent said high thermal conductivity material from migrating radially inward of said groove and said rib when said high thermal conductivity material is injected into said space; and
  wherein said motor assembly includes a stator assembly fixed to said housing to prevent relative rotation between said stator assembly and said housing, said stator assembly comprising:
  a stator having a plurality of electrical windings; and
  a stator support frame axially offset from said stator;

wherein said stator is fixed to said stator support frame with an over-molding material, and wherein said one of said groove and said rib is formed in said over-molding material.

2. An actuator assembly as in claim 1 wherein said stator support frame includes a stator support frame aperture extending axially therethrough for disposing said high thermal conductivity material into said space.

3. An actuator assembly as in claim 1 wherein said motor assembly further comprises a rotor assembly which is rotatable within said stator assembly, and wherein said rib and said groove prevent said high thermal conductivity material from migrating to said stator assembly.

4. An actuator assembly as in claim 1 wherein said space is formed between said stator and said housing.

5. An actuator assembly as in claim 4 wherein said high thermal conductivity material possesses adhesive properties to aid in fixing said stator to said housing.

6. An actuator assembly as in claim 1 wherein said high thermal conductivity material possesses adhesive properties to aid in fixing said motor assembly to said housing.

7. An actuator assembly as in claim 1 wherein said groove is one of a plurality of grooves and wherein said rib is one of a plurality of ribs such that each of said plurality of ribs fits within a respective one of said plurality of grooves to prevent said high thermal conductivity material from migrating radially inward of said plurality of grooves and said plurality of ribs when said high thermal conductivity material is injected into said space.

8. An electric rotating machine comprising:
   a housing having a central axis and having a motor compartment defined about said central axis and a housing wall defining a bottom of said motor compartment;
   a motor assembly in said motor compartment defining a space radially between said motor assembly and said motor compartment; and
   a high thermal conductivity material disposed within said space to transfer heat from said motor assembly to said housing;
   wherein said housing wall includes one of a groove and a rib on a side of said housing wall that faces said motor compartment; and
   wherein said motor assembly includes the other of said groove and said rib such that said rib fits within said groove to prevent said high thermal conductivity material from migrating radially inward of said groove and said rib when said high thermal conductivity material is injected into said space; and
   wherein said motor assembly includes a stator assembly fixed to said housing to prevent relative rotation between said stator assembly and said housing, said stator assembly comprising:
   a stator having a plurality of electrical windings; and
   a stator support frame axially offset from said stator;
   wherein said stator is fixed to said stator support frame with an over-molding material, and wherein said one of said groove and said rib is formed in said over-molding material.

9. An electric rotating machine as in claim 8 wherein said stator support frame includes a stator support frame aperture extending axially therethrough for disposing said high thermal conductivity material into said space.

10. An electric rotating machine as in claim 8 wherein said motor assembly further comprises a rotor assembly which is rotatable within said stator assembly, and wherein said rib and said groove prevent said high thermal conductivity material from migrating to said stator assembly.

11. An electric rotating machine as in claim 8 wherein said space is formed between said stator and said housing.

12. An electric rotating machine as in claim 11 wherein said high thermal conductivity material possesses adhesive properties to aid in fixing said stator to said housing.

13. An electric rotating machine as in claim 8 wherein said high thermal conductivity material possesses adhesive properties to aid in fixing said motor assembly to said housing.

14. An electric rotating machine as in claim 8 wherein said groove is one of a plurality of grooves and wherein said rib is one of a plurality of ribs such that each of said plurality of ribs fits within a respective one of said plurality of grooves to prevent said high thermal conductivity material from migrating radially inward of said plurality of grooves and said plurality of ribs when said high thermal conductivity material is injected into said space.

\* \* \* \* \*